(12) United States Patent
Nakamura et al.

(10) Patent No.: US 7,247,395 B2
(45) Date of Patent: *Jul. 24, 2007

(54) MAGNETIC RECORDING MEDIUM EXHIBITING LOW NOISE AND HIGH COERCIVE FORCE

(75) Inventors: Miyabi Nakamura, Ibaragi (JP);
Takahiro Shimizu, Nagano (JP);
Hiroyuki Uwazumi, Nagano (JP);
Naoki Takizawa, Nagano (JP); Tadaaki Oikawa, Nagano (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 38 days.

This patent is subject to a terminal disclaimer.

(21) Appl. No.: 10/319,842

(22) Filed: Dec. 16, 2002

(65) Prior Publication Data
US 2003/0198832 A1      Oct. 23, 2003

(30) Foreign Application Priority Data
Dec. 14, 2001    (JP)    ............................. 2001-382164

(51) Int. Cl.
*G11B 5/66* (2006.01)
*G11B 5/70* (2006.01)

(52) U.S. Cl. .................................. 428/831.2

(58) Field of Classification Search .......... 428/694 TS, 428/694 T, 212, 900, 831, 831.2
See application file for complete search history.

(56) References Cited

U.S. PATENT DOCUMENTS

| | | | |
|---|---|---|---|
| 5,679,473 A | 10/1997 | Murayama et al. | ...... 428/694 T |
| 5,900,323 A | 5/1999 | Okamoto et al. | |
| 6,110,582 A | 8/2000 | Wu et al. | |
| 6,132,863 A | 10/2000 | Song et al. | |
| 6,221,481 B1 | 4/2001 | Wu et al. | |

(Continued)

FOREIGN PATENT DOCUMENTS

EP       0704839 A1    4/1996

(Continued)

OTHER PUBLICATIONS

U.S. Appl. No. 10/317,221, filed Dec. 12, 2002, Oikawa et al.

(Continued)

*Primary Examiner*—Holly Rickman

(57) ABSTRACT

A magnetic recording medium exhibiting low noise and having a sufficiently high coercive force includes a magnetic layer having a granular structure including ferromagnetic crystal grains with a hexagonal closed packed structure and a nonmagnetic grain boundary region of mainly an oxide intervening between the crystal grains. An underlayer has a body-centered cubic lattice structure. A nonmagnetic intermediate layer with the hexagonal closest packed structure includes Ru, Os, and/or Re, which are provided between the magnetic layer and the underlayer. A degree of mismatching $\Delta = |d_1 - d_2|/d_1$ is at most 10%, for instance, in a range from 2.5% to 7.0%, where $d_1$ is a spacing of lattice planes of the crystal grains in the magnetic layer and $d_2$ is a spacing of the lattice planes of the crystal grains in the intermediate layer. A proportion of the crystal grains with a grain size of equal or greater than 8 nm are at most 10% of the crystal grains included in the intermediate layer and a standard deviation of the grain size is at most 1.4 nm. The layers are deposited without preheating the substrate.

14 Claims, 4 Drawing Sheets

U.S. PATENT DOCUMENTS

| | | | |
|---|---|---|---|
| 6,767,651 B2* | 7/2004 | Uwazumi et al. | 428/831 |
| 2001/0036564 A1* | 11/2001 | Ohmori | 428/694 TS |
| 2003/0157373 A1* | 8/2003 | Kirino et al. | 428/694 DE |

FOREIGN PATENT DOCUMENTS

| | | |
|---|---|---|
| JP | 11-213371 | 8/1999 |
| JP | 2000-082210 | 3/2000 |
| JP | 2000-123345 | 4/2000 |

OTHER PUBLICATIONS

U.S. Appl. No. 10/324,105, filed Dec. 20, 2002, Iso et al.

Search Report and Witten Opinion issued by Singapore/Danish Patent and Trademark Office issued Aug. 30, 2004.

* cited by examiner

MAGNETIC RECORDING MEDIUM EXHIBITING LOW NOISE AND HIGH COERCIVE FORCE

CROSS-REFERENCE TO RELATED APPLICATIONS

This application claims the benefit of Japanese Application No. 2001-382164 filed Dec. 14, 2001 in the Japanese Patent Office, the disclosure of which is incorporated herein by reference.

BACKGROUND OF THE INVENTION

1. Field of the Invention

The present invention relates in general to a magnetic recording medium and, in particular, to a high performance and highly reliable magnetic recording medium that exhibits low noise and sufficiently high coercive force and is mounted on a variety of magnetic storage devices, such as an external storage device of a computer.

2. Description of the Related Art

A magnetic storage device is one of information recording devices that support a highly informational society in recent years. With an increase of information to vast amounts, magnetic recording media used in magnetic storage devices are forced towards a higher recording density and lower noises. Achieving the high recording density needs minimization of a unit size of inversion of magnetization, which in turn requires a minute magnetic grain size. Lowering of noises needs a reduction of a fluctuation of magnetization due to a magnetic interaction between grains in addition to the minute magnetic grain size.

A magnetic layer using a CoCrPt alloy in a conventional medium contains a great amount of chromium to segregate enough chromium towards a grain boundary region to achieve noise reduction. As a result, a magnetic anisotropy constant Ku of the magnetic grains is lowered, and a thermal stability of the medium deteriorates. On the other hand, if a platinum content is increased aiming at enhancement of the Ku value, the chromium segregation to the grain boundary region is hindered, resulting in an increase of media noise. Thus, there exists a trade-off relationship between the thermal stability and the noise reduction.

To address the problems set forth, a variety of proposals have been made including compositions and structures of the magnetic layer, and materials for a nonmagnetic underlayer and a seed layer. Specifically, a type of medium has been proposed having a so-called granular magnetic layer including magnetic crystal grains and a nonmagnetic matrix of an oxide or a nitride surrounding the crystal grains. In the medium having the granular magnetic layer, the magnetic crystal grains are nearly perfectly isolated magnetically from each other by virtue of the intervening nonmagnetic substance. Because a minimum magnetization unit can be a size of an individual grain, which is 4 to 10 nm, for which a high recording density is possible. Furthermore, an exchange in an interaction between the crystal grains is expected to be suppressed by the nonmagnetic matrix surrounding each grain.

The granular magnetic layer inherently allows to avoid an addition of quantities of chromium because the grain boundary segregation is principally performed by silicon oxide contrary to a conventional CoCrPt magnetic layer. Because the silicon oxide is compelled to precipitate at the grain boundary in the granular magnetic layer, the grain boundary segregation is promoted without lowering the magnetic anisotropy constant Ku, which means compatibility with noise reduction. For higher recording density in the future, it is indispensable to make the magnetic layer thinner. The thinner magnetic layer has lower magnetic anisotropy energy KuV, where Ku: magnetic anisotropy constant and V: activation volume. To prevent lowering of the magnetic anisotropy energy, the magnetic anisotropy constant Ku must be increased, which requires an addition of an amount of platinum to the composition of the magnetic layer. Addition of large amounts of platinum inhibits the grain boundary segregation of chromium in the conventional CoCrPt magnetic layer and increases noises, in the granular magnetic layer. In contrast, because silicon oxide easily segregates to the grain boundary region even if plenty of platinum is added, the granular magnetic layer has an advantage that larger amount of platinum can be contained while maintaining isolation of magnetic grains.

U.S. Pat. No. 5,679,473, for example, discloses that low noise is achieved by a granular recording film having a structure in which each magnetic crystal grain is separated by nonmagnetic oxide surrounding the magnetic crystal grain. The granular recording film may be formed by deposition employing an RF sputtering using a target of CoNiPt with an additive of an oxide such as $SiO_2$. In such a granular magnetic film, because a nonmagnetic and nonmetallic phase physically separates each magnetic grain, magnetic interaction between the magnetic grains diminishes. So, a formation of a zigzag magnetic domain wall is suppressed, which arises at a transition region of a recording bit, leading to achieving low noise characteristics.

Japanese Unexamined Patent Application Publication Nos. 11-213371 and 2000-123445 disclose depositing an underlayer with a body centered cubic structure prior to depositing the magnetic layer that has a hexagonal closed packed structure. Japanese Unexamined Patent Application Publication No. 2000-82210 discloses a magnetic recording medium provided with a nonmagnetic intermediate layer with a body centered cubic structure between the magnetic layer and the underlayer.

SUMMARY OF THE INVENTION

In order to accomplish a medium with an excellent electromagnetic conversion characteristic using a granular magnetic layer, an oxide such as $SiO_2$ and a cobalt alloy that are contained in a target need to be well separated in a deposited magnetic film. It is also important to make a size of a magnetic grain homogeneous to reduce noises.

When a platinum content in the granular magnetic layer is increased to cope with further high density recording in the future, degradation of lattice matching is anticipated due to increase of an amount of misfit between a conventional CoCr alloy intermediate layer and the magnetic layer because lattice constants of an CoCrPt alloy of the magnetic layer increase in proportion only to the platinum content.

Indeed low noise may be achieved by a structure in which a nonmagnetic and nonmetallic grain boundary region separates the magnetic grains. Nevertheless, if a nonmagnetic intermediate layer is deposited using a material with a hexagonal closed packed structure or a body centered cubic structure that has a spacing of lattice planes different from that of the crystal grains in the magnetic layer by a relative proportion over 15%, a grain size of the magnetic grains in the magnetic layer cannot be controlled without difficulty by depositing the magnetic layer on the nonmagnetic intermediate layer because of inferior lattice matching between crystal grains in the intermediate layer and the crystal grains in the magnetic layer. That is, to accomplish further low noise in a magnetic recording medium, it is required to precisely control minute and uniform grain size of the magnetic crystal grains in the intermediate layer.

Accordingly, an aspect of the present invention is to provide a magnetic recording medium with low noise and high coercive force. By controlling a structure and a grain size distribution of a nonmagnetic intermediate layer, a structure and a grain size of a crystal grain in a magnetic layer deposited on the intermediate layer are controlled to achieve low noise. By controlling the structure and the grain size distribution of the intermediate layer, a distance between the crystal grains in the magnetic film is controlled and the interaction between the magnetic crystal grains is diminished, which leads to a high coercive force even in the case of minute grain size of the magnetic crystal grains in the magnetic layer.

Noise reduction a grain size control of the granular magnetic layer has been studied for the present invention and it has been found that, when a magnetic layer is deposited on a crystalline nonmagnetic intermediate layer with a hexagonal closed packed structure, which is the same as that of a ferromagnetic crystal grains in the magnetic layer, each cobalt grain in the magnetic layer grows corresponding to a crystalline grain in the intermediate layer, and an oxide in the magnetic layer segregates and grows corresponding to an amorphous region or a porous region around a grain boundary of the crystal grain in the intermediate layer. A grain size of the crystal grains in the magnetic layer has been demonstrated possibly to be controlled by controlling a grain size of the crystal grains of the intermediate layer on which the magnetic layer grows. Thus, excellent magnetic performances can be achieved. In other words, magnetic crystal grains epitaxially grow on the crystal grains in the nonmagnetic intermediate layer made by a sputtering method. As a result, a crystal alignment of the nonmagnetic intermediate layer is followed by the magnetic layer to control the crystal alignment of the magnetic layer and, at the same time, to form an amorphous grain boundary region around the crystal grains in the magnetic layer. Thus, a crystal structure of the magnetic layer having a granular structure can be controlled.

To accomplish the above object, a magnetic recording medium, according to an aspect of the present invention, includes a nonmagnetic underlayer, a magnetic layer, a protective layer, and a lubricant film sequentially laminated on a substrate. The magnetic layer has a granular structure including ferromagnetic crystal grains with a hexagonal closed packed structure and a nonmagnetic grain boundary region of mainly oxide intervening between the ferromagnetic crystal grains. The underlayer has a body centered cubic structure.

Advantageously, a magnetic recording medium, according to an aspect of the invention, further includes a nonmagnetic intermediate layer with the hexagonal closed packed structure disposed between the magnetic layer and the underlayer. The intermediate layer includes a nonmagnetic metal mainly including Ru, Os, and/or Re, wherein a degree of mismatching $\Delta = |d_1 - d_2|/d_1$ is at most 10%, for instance in a range from 2.5% to 7.0%, where $d_1$ is a spacing of lattice planes of crystal grains included in the magnetic layer and $d_2$ is a spacing of lattice planes of crystal grains included in the nonmagnetic intermediate layer.

Furthermore, a proportion of the crystal grains with a grain size of not smaller than 8 nm are at most 10% of crystal grains included in the intermediate layer, and a standard deviation of the grain size is at most 1.4 nm. Here, "standard deviation", according to an aspect of the present invention, is the square root of an unbiased variance.

The substrate is not subjected to intentional heating prior to depositing of the layers. The substrate may be a resin substrate.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
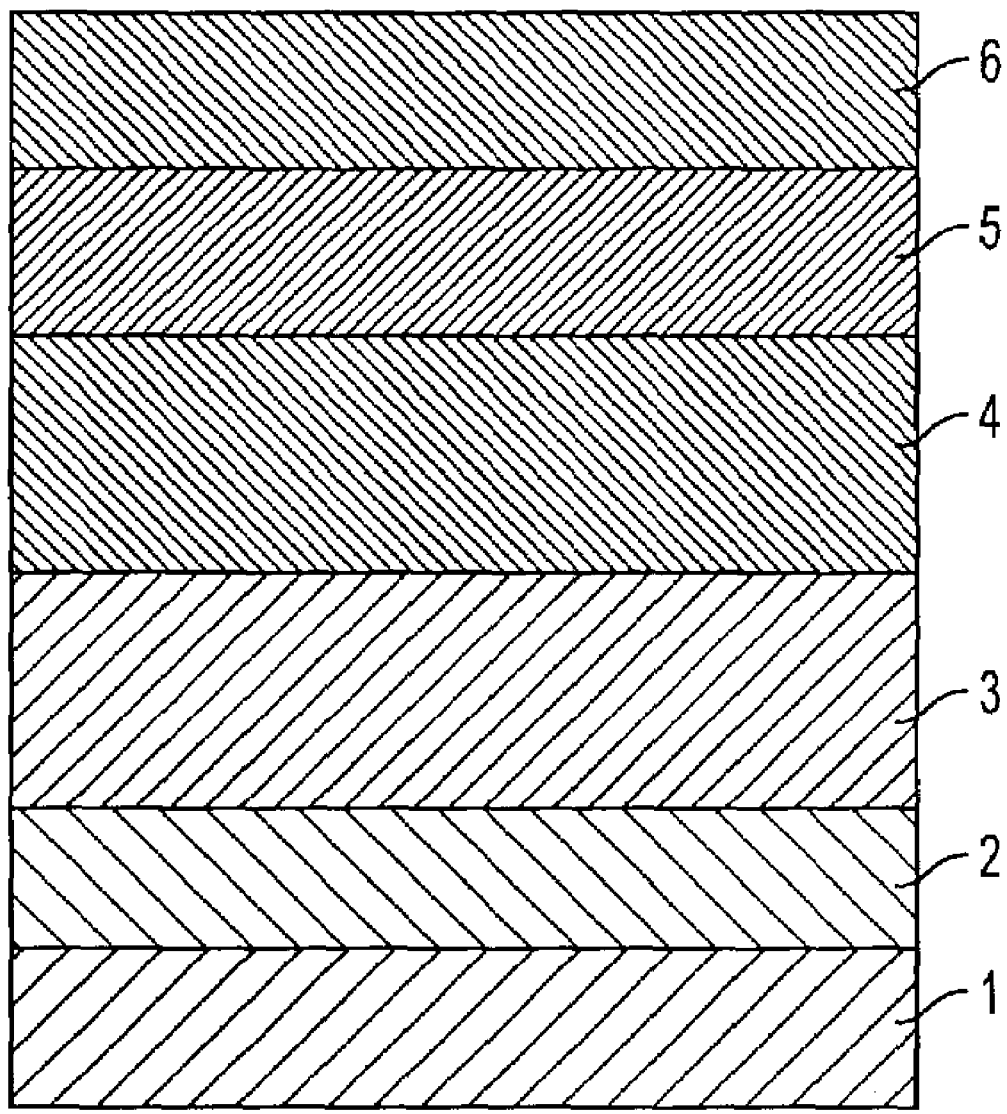
FIG. 1 is a schematic cross-sectional view of an example of an embodiment of a magnetic recording medium, according to an aspect of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

EXAMPLE 1

FIG. 1 is a drawing illustrating an example of a construction of a magnetic recording medium, according to an aspect of the present invention. Sequentially laminated on a substrate 1 are an underlayer 2, a nonmagnetic intermediate layer 3, a granular magnetic layer 4, a carbon protective layer 5, and a lubricant film 6.

The substrate 1 may be a 3.5 inch diameter disk of polyolefin resin with a smooth surface. After cleaning, the substrate is introduced into a sputtering apparatus and an underlayer 2 with a body centered cubic structure is deposited thereon using a DC sputtering method.

The nonmagnetic intermediate layer 3 having a thickness of 20 nm is formed on the underlayer 2 by the DC sputtering method at a deposition rate of 2.3 nm/sec under a discharge argon gas pressure of 30 mTorr. Subsequently, the granular magnetic layer 4 having a thickness of 10 nm is formed using an RF sputtering method using a target of $Co_{76}Cr_{12}Pt_{12}$ added by 10 mol % of $SiO_2$ under the discharge argon gas pressure of 15 mTorr. After depositing the carbon protective layer 5 having a thickness of 8 nm, the laminated substrate 1 is taken out from a vacuum chamber of the sputtering apparatus. Then, a liquid lubricant is applied to form the lubricant film 6 having a thickness of 1.5 nm. Compositions of the nonmagnetic intermediate layer 3 are Ti-30 at % Cr, Co-35 at % Cr, Os, Re, and Ru. Heating the substrate 1 before depositing the intermediate layer 3 is not executed.

Magnetic recording media are subjected to measurements including a coercive force Hc, using a vibrating sample magnetometer VSM, and reading and recording performance using a GMR head on a spinning stand tester. A signal to noise ratio SNR is evaluated at a linear recording density of 270 kFCl. Some of the test results indicative thereof are shown in Table 1.

TABLE 1

| Intermediate layer material | Magnetic layer composition | HC (Oe) | Grain size (nm) | Grain Size deviation (*) | SNR (dB) | Degree of mismatching (%) |
|---|---|---|---|---|---|---|
| Ru | $Co_{76}Cr_{12}Pt_{12-10}$ at % $SiO_2$ | 3,500 | 6 | 0.2 | 19.0 | 4.8 |
| Re | same as above | 3,600 | 7 | 0.2 | 18.8 | 6.9 |
| $Ti_{70}Cr_{30}$ | same as above | 2,800 | 11 | 0.4 | 16.2 | 14.4 |
| $Co_{65}Cr_{35}$ | same as above | 3,300 | 9 | 0.3 | 14.1 | 2.8 |
| Ru | $Co_{72}Cr_{12}Pt_{16-10}$ at % $SiO_2$ | 3,850 | 6 | 0.2 | 21.2 | 3.9 |
| Re | same as above | 3,910 | 7 | 0.2 | 20.7 | 6.0 |
| $Ti_{70}Cr_{30}$ | same as above | 3,050 | 12 | 0.4 | 16.8 | 13.3 |
| $Co_{65}Cr_{35}$ | same as above | 3,550 | 9 | 0.3 | 14.7 | 3.7 |
| Ru | $Co_{68}Cr_{12}Pt_{20-10}$ at % $SiO_2$ | 4,210 | 6 | 0.2 | 23.4 | 2.7 |
| Re | same as above | 4,350 | 7 | 0.2 | 23.1 | 4.8 |
| $Ti_{70}Cr_{30}$ | same as above | 3,340 | 11 | 0.4 | 17.3 | 12.1 |
| $Co_{65}Cr_{35}$ | same as above | 3,820 | 10 | 0.3 | 15.5 | 4.8 |

(*) standard deviation of grain size divided by mean value of the grain size

In the case of the intermediate layer material of TiCr alloy, a degree of mismatching is larger than 12%. Consequently, an epitaxial growth of the magnetic layer from the intermediate layer is inhibited, and the grain size and associated deviation in the magnetic layer are large. As a result, the performances of Hc and SNR are inferior to the case of the intermediate layer of ruthenium and the intermediate layer of rhenium. As for the case of the intermediate layer of CoCr alloy, the grain size of the magnetic crystal grains is large because the deposition process for the material accompanies difficulty in generating fine grains, although the degree of mismatching is smaller than in the case of the intermediate layer of ruthenium or rhenium. As a result, the SNR is significantly inferior to the cases of the ruthenium intermediate layer and the rhenium intermediate layer. It has been demonstrated that the coercive force Hc and the SNR are significantly improved with the nonmagnetic intermediate layer 3 made of Re, Os, or Ru, wherein a degree of mismatching $\Delta=|d_1-d_2|/d_1$ is at most 10%, for instance in a range from 2.5% to 7.0%, where $d_1$ is a spacing of lattice planes of crystal grains included in the magnetic layer 4 and $d_2$ is a spacing of lattice planes of crystal grains included in the nonmagnetic intermediate layer 3.

EXAMPLE 2

In this example, the underlayer 2 is deposited by a sputtering method to control the grain size of the crystal grains in the nonmagnetic intermediate layer 3 shown in FIG. 1. The nonmagnetic intermediate layer 3 is deposited on the underlayer 2. The material for the intermediate layer 3 is limited to ruthenium in this example. Lamination of the intermediate layer 3 is executed at two deposition rates: 1.1 nm/sec and 2.3 nm/sec. The other conditions are the same as those described in Example 1.

Ruthenium is used for the material of the intermediate layer 3. The intermediate layer 3 that is 20 nm thick is deposited using the DC sputtering method at the deposition rate of 2.3 nm/sec under a discharging argon gas pressure of 70 mTorr. Observation of a cross section of the intermediate layer 3 by TEM revealed a porous structure including columnar crystals perpendicular to the substrate 1 surface. The columnar crystals are confirmed grown without abnormal growth in which the crystal grains expand in a course of the growth, for example. A so-called "initial growth layer" is not observed around an interface between the underlayer 2 and the intermediate layer 3. The grain size is determined by a planar observation by the TEM. A mean grain size is about 6 nm. A distribution of the grain sizes is a normal distribution, and a standard deviation is 1.8 nm.

For the purpose of making the grain size in the intermediate layer 3 smaller, an intermediate layer 3 of 20 nm in thickness is obtained at a depositing rate of 1.1 nm/sec under the discharging argon gas pressure of 70 mTorr. An observation of the cross section of the obtained intermediate layer 3 by the TEM, showed the porous structure including the columnar crystals perpendicular to the substrate 1 surface. These columnar crystals are confirmed grown without an abnormal growth in which the crystal grains expand in the course of the growth. An initial growth layer is not observed around the interface between the underlayer 2 and the intermediate layer 3. The grain size is determined by the planar observation by the TEM to generate a grain size of about 5 nm. The distribution of the grain sizes is a normal distribution, and the standard deviation is 1.4 nm.

A dependence of a crystal alignment on the deposition rate is studied using an in-plane X-ray diffraction analysis about the crystal structure of the intermediate layers that are deposited fixing the conditions other than the deposition rate. In addition to an intense peak of ruthenium (002) at around $2\theta=18°$, results show weak peaks of ruthenium (100) and ruthenium (101) at around $2\theta=17°$ and $2\theta=19°$, respectively. Analyzing the results together with the above-described TEM observation, the ruthenium c-axis is predominantly aligned in-plane. It has been confirmed that the control of the grain size and associated distribution are possible while preserving the crystal alignment by controlling the deposition rate.

EXAMPLE 3

In Example 3, the underlayer 2 is deposited by the sputtering method to control the grain size of the crystal grains in the nonmagnetic intermediate layer 3 shown in FIG. 1. The nonmagnetic intermediate layer 3 is deposited on the underlayer 2. The other conditions are the same as those described in Example 1. Ruthenium is used for the material of the nonmagnetic intermediate layer 3. Intermediate layers having various thicknesses are deposited using the DC sputtering method at the deposition rate of 2.3 nm/sec under the discharging argon gas pressure of 70 mTorr. The other conditions are the same as those described in Example 1.

Planar TEM observations are made on a relatively thin intermediate layer 3 being 10 nm thick and a relatively thick intermediate layer 3 being 50 nm thick. The grain sizes of the two intermediate layers are determined by image analysis based on the TEM observation, to give mean grain sizes of 6 nm and 8 nm, respectively. A distribution of the grain sizes is a normal distribution, and the values of the standard deviation are 1.4 nm and 2.2 nm, respectively. Observation of a cross section of each of the intermediate layers by the TEM revealed a columnar structure in both films. An initial growth layer is not observed around the interface between the underlayer 2 and the intermediate layer 3.

Further in this example, the underlayer 2 is deposited by the sputtering method to control the grain size of the crystal grains in the nonmagnetic intermediate layer 3 shown in FIG. 1. The nonmagnetic intermediate layer 3 is deposited on the underlayer 2. Ruthenium is used as a material of the intermediate layer 3. Intermediate layers having a fixed thickness of 20 nm are deposited using the DC sputtering method at the deposition rate of 2.3 nm/sec under the discharging argon gas pressure of 49 mTorr, which is 0.7 times above-mentioned 70 mTorr and 84 mTorr, which is 1.2 times the 70 mTorr. The other conditions are the same as those described in Example 1.

A planar TEM observation is made on the deposited intermediate layers. Grain sizes are determined by an image analysis based on the TEM observation, to give mean grain sizes of 8 nm and 5 nm, respectively. A distribution of the grain sizes is a normal distribution, and values of the standard deviation are 2.4 nm and 1.9 nm, respectively. Observation of the cross section of each of the intermediate layers by the TEM revealed columnar structure in both films. The initial growth layer is not observed around the interface between the underlayer 2 and the intermediate layer 3.

A crystal alignment of the intermediate layers is analyzed using an in-plane X-ray diffraction method and the TEM observation, and a predominant in-plane alignment of the ruthenium c-axis is certified. Although a significant difference is not observed in a crystal alignment between different deposition conditions, a thick intermediate layer 3 caused larger scatter in the crystal grain size due to lattice defects and crystal growth. Furthermore, when the argon gas pressure is low, the grain boundary region between the crystal grains is narrow because the grain size is large and the film is dense.

As described above, the grain size of the crystal grain and structure of the nonmagnetic intermediate layer 3 can be controlled by the thickness of the intermediate layer 3 and the argon gas pressure during the deposition process of the intermediate layer 3. When the thickness of the intermediate layer 3 is thinner than 5 nm, a stable deposition is difficult because of the construction of the deposition apparatus. When the intermediate layer 3 is thicker than 100 nm, the manufacturing process is imposed by a restriction of a requirement of a long deposition time.

EXAMPLE 4

In Example 4, the magnetic recording medium is produced by depositing the magnetic layer of a cobalt alloy on the nonmagnetic intermediate layer 3 deposited under the conditions described in Example 2. Namely, ruthenium of the nonmagnetic intermediate layer 3 that is 20 nm thick is deposited at the deposition rate of 2.3 nm/sec under the discharge argon gas pressure of 70 mTorr. On the intermediate layer 3, the granular magnetic layer 4 that is 10 nm thick is deposited using the RF sputtering method using the target of $Co_{76}Cr_{12}Pt_{12}$ containing 10 mol % of $SiO_2$ under the discharge argon gas pressure of 15 mTorr. After laminating a carbon protective layer of 8 nm thick, the laminated substrate 1 is taken out from the vacuum chamber. Then, a liquid lubricant was applied to the thickness of 1.5 nm to form a lubricant film. Thus, the magnetic recording medium having the structure as shown in FIG. 1 is produced. Substrate heating is not conducted prior to the deposition.

Figure 2:
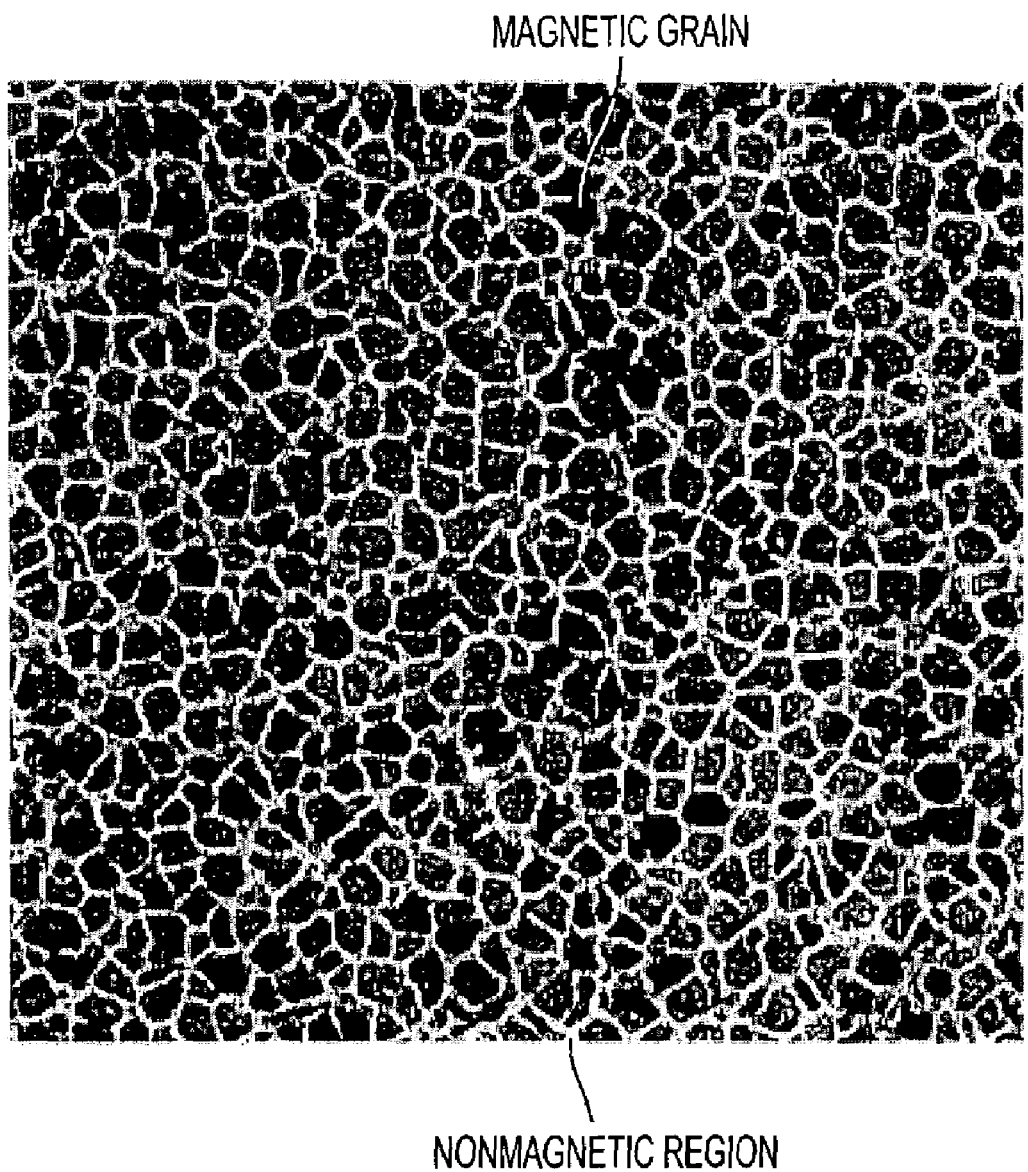
FIG. 2 is a planar TEM image of a magnetic layer of the magnetic recording medium.

FIG. 2 is a picture of a structure of the magnetic layer of the obtained magnetic recording medium taken by the planar TEM. The magnetic layer is certified to have the granular structure including the magnetic crystal grains and a region of nonmagnetic phase surrounding the grains. An observation of the lattice image of the grain boundary region under a high resolution condition reveals that the cobalt alloy grain is crystalline and the grain boundary region is amorphous. A mean distance between the crystal grains is 1.1 nm and a standard deviation is 2.0 nm. A grain size measurement resulted in the mean grain size of 4.9 nm.

Figure 3:
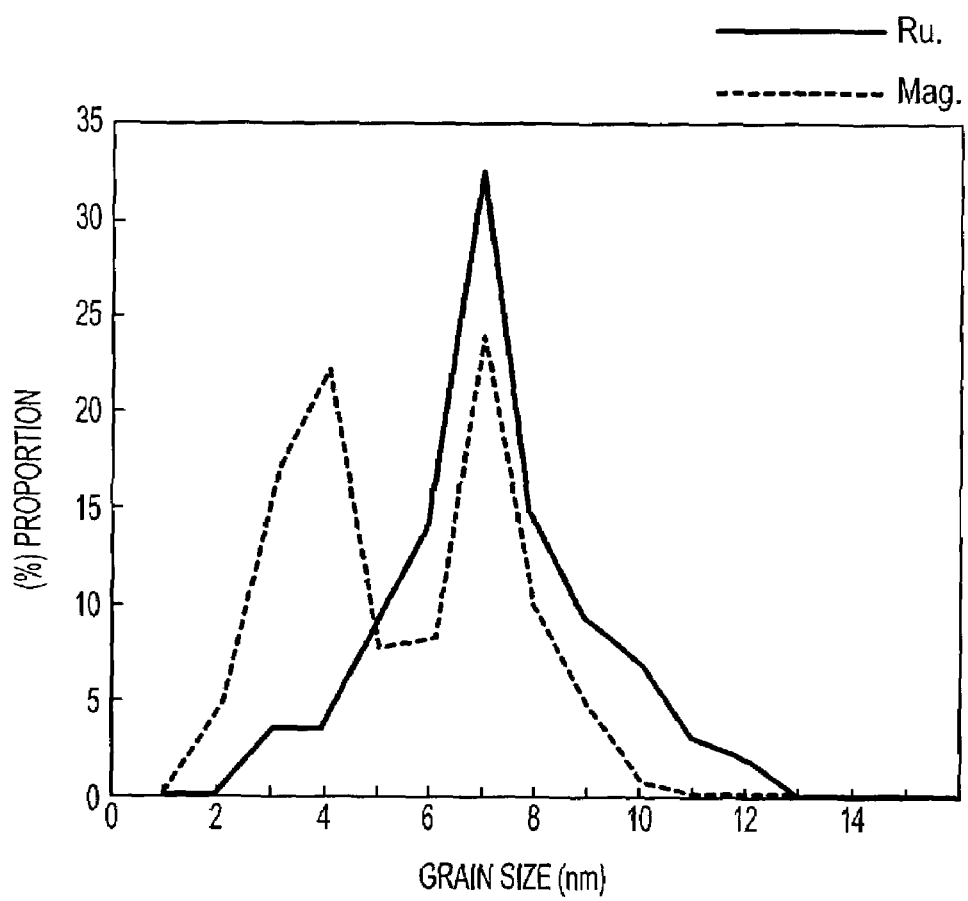
FIG. 3 is a graph showing a grain size distribution of a nonmagnetic intermediate layer and a magnetic layer of the magnetic recording medium, according to an aspect of the present invention.

FIG. 3 is a graph illustrating the grain size distribution of the ruthenium intermediate layer 3 and the magnetic layer 4 in the magnetic recording medium of Example 4. The distribution of the grain size in the magnetic layer shows two peaks at around the grain sizes of 4 nm and 8 nm. The deviation is defined by a standard deviation divided by a mean grain size, which is 0.4.

Figure 4:
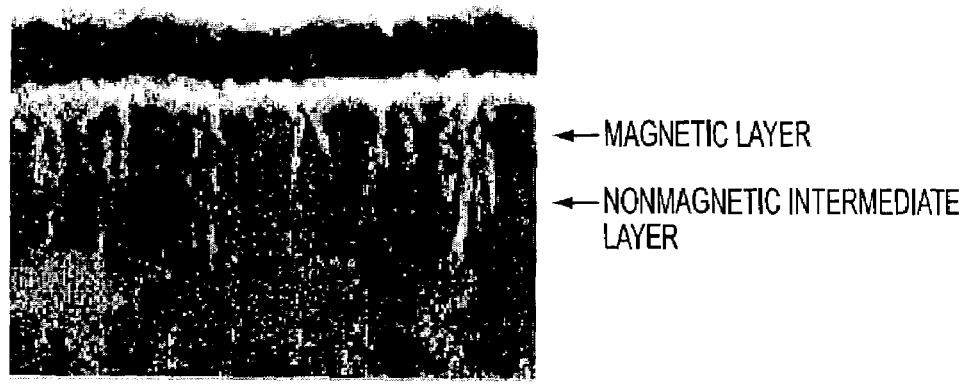
FIG. 4 is a cross section of the TEM image of the nonmagnetic intermediate layer and the magnetic layer of the magnetic recording medium.

FIG. 4 is a picture of a cross section of the magnetic film obtained by the TEM observation. Continuation of the crystal lattice is observed between the intermediate layer 3 and the magnetic layer 4, and the crystal grains in the magnetic layer is shown epitaxially growing from the interface with the intermediate layer 3. The crystalline phase of the cobalt alloy and the amorphous phase of the grain boundary region are different in the growth mechanism of the magnetic film and have a different respective metallographic structure. An in-plane X-ray diffraction shows an intense peak of cobalt (002) at around $2\theta=19°$. Considering a result of X-ray diffraction by a $\theta-2\theta$ method together with the result of the TEM observation, a predominant alignment of cobalt (100) is known.

Magnetic properties of the magnetic layer are measured by a vibrating sample magnetometer (VSM). A coercive force is 2.9 kOe, and indices of squareness of an M-H hysteresis loop: a squareness ratio S and a coercivity squareness ratio S* are both 0.8. Thus, good magnetic performances have been demonstrated. Such squareness of the hysteresis loop result from reduction in interactions between magnetic crystal grains in the magnetic layer 3 and a reduction is produced because the growth mechanism of the magnetic layer is different from the previous one due to the formation of the nonmagnetic grain boundary region.

EXAMPLE 5

In Example 5, the underlayer 2 is deposited by the sputtering method to control the grain size of the crystal grains in the nonmagnetic intermediate layer 3 shown in FIG. 1. The intermediate layer 3 is deposited on the underlayer 2. Ruthenium is used for the material of the nonmagnetic intermediate layer 3. Intermediate layers having various thicknesses are deposited, such as by the DC sputtering method at the deposition rate of 1.1 nm/sec under the discharge argon gas pressure of 70 mTorr. The magnetic recording medium is produced under the deposition and other conditions that are the same as those described in Example 1. The substrate heating prior to the deposition processes are not conducted.

The obtained magnetic layer 4 is observed by the planar TEM. The granular structure of the magnetic layer 4 is confirmed in which crystal grains are surrounded by a nonmagnetic phase region. The observation of the lattice image under a high resolution condition reveals that the cobalt alloy crystal grain is crystalline and the grain boundary region is amorphous. A mean distance between the crystal grains is 1.5 nm and the standard deviation is 1.4 nm. The grain size measurement resulted in a mean grain size of 4.0 nm.

Figure 5:
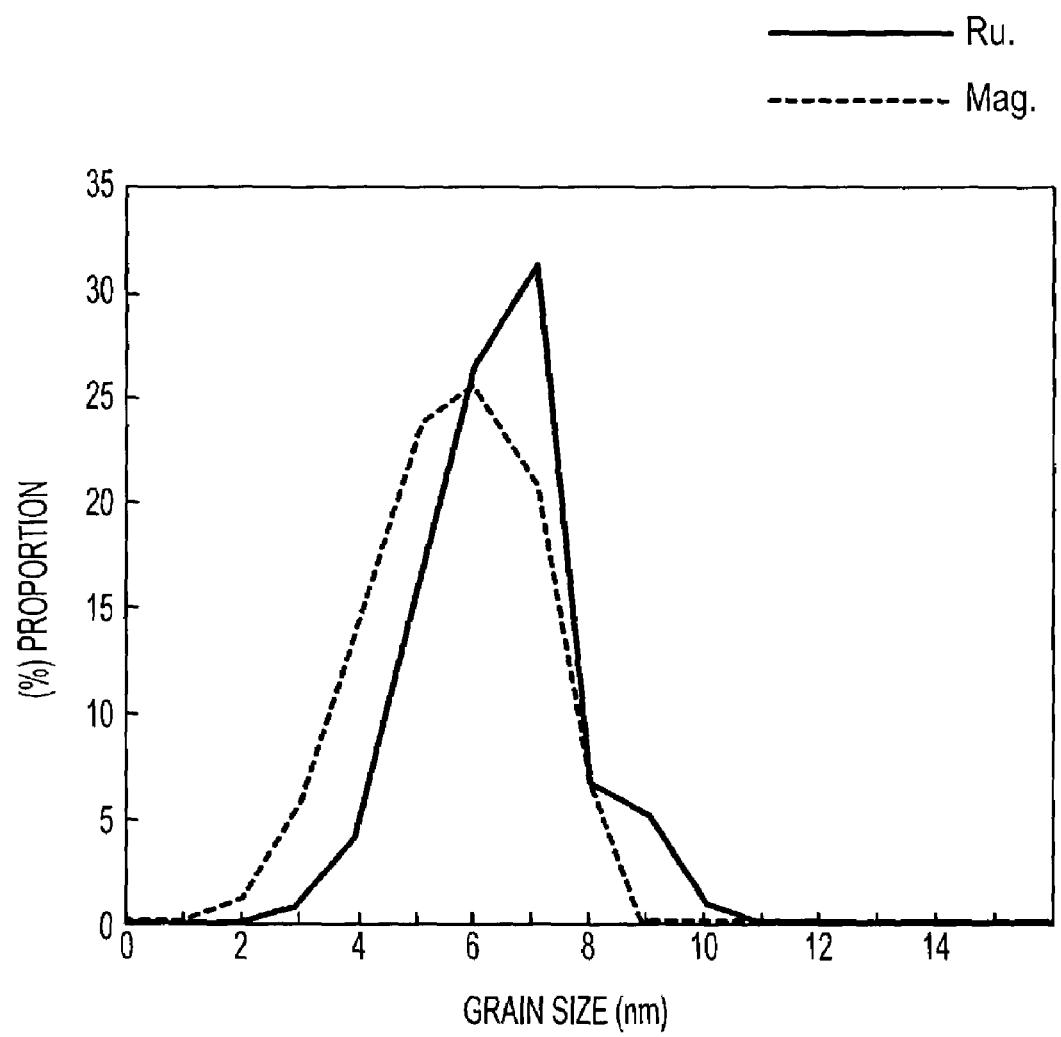
FIG. 5 is a graph showing the grain size distribution of the nonmagnetic intermediate layer and the magnetic layer of the magnetic recording medium, according to another aspect of the present invention.

FIG. 5 is a graph illustrating the grain size distribution of the ruthenium nonmagnetic intermediate layer 3 and the magnetic layer 4 in the magnetic recording medium of this example. The distribution of the grain size in the magnetic layer 4 shows a peak at around the grain size of 6 nm, and a deviation thereof is defined by the standard deviation divided by the mean grain size, which is 0.2.

The cross sectional structure of this film is observed by the TEM. A continuation of the lattice is observed between the intermediate layer 3 and the magnetic layer 4, and the crystal grains in the magnetic layer 4 are shown epitaxially growing from the interface with the intermediate layer 3. The crystalline phase and the grain boundary phase in the magnetic layer 4 are different in the growth mechanism and have a different respective metallographic structure. An in-plane X-ray diffraction show an intense peak of cobalt (002) at around 2θ=19°. Considering the result of X-ray diffraction by a θ–2θ method together with the result of the TEM observation, the predominant alignment of cobalt (100) is known.

Magnetic properties of the magnetic layer 4 are measured by the VSM. The coercive force is 3.5 kOe, and the indices of squareness of the M-H hysteresis loop: the squareness ratio S and the coercivity squareness ratio S* are 0.9 and 0.8, respectively. Thus, excellent magnetic performances are demonstrated. Such squareness of the hysteresis loop results, on the one hand, from a normal distribution of the grain size, and on the other hand, from a reduction of the interactions between the magnetic crystal grains. The reduction is produced because the growth mechanism of the magnetic layer 4 is different from the previous one due to an existence of the grain boundary region of the intermediate layer 3.

EXAMPLE 6

Table 2 summarizes evaluation results of the recording performances of a magnetic disk using the magnetic film having the magnetic characteristics shown in Example 4 and Example 5. The recording performances are measured by a spinning stand tester equipped with a GMR head, and the reproduced output of an isolated read back pulse is evaluated at the linear recording density of 160 kFCl.

TABLE 2

| Sample | Overwrite (dB) | TAA (*) (mV) | noise (µV) | SNR (dB) |
|---|---|---|---|---|
| Example 4 | 46.4 | 0.98 | 81.8 | 15.6 |
| Example 5 | 43.7 | 0.94 | 53.0 | 19.0 |

(*) track average amplitude

The magnetic recording medium of Example 5 exhibits reduction in noises by 35% and improvement in SNR by 16% as compared with the magnetic recording medium of Example 4. As shown in the results of the grain size analysis of the magnetic layer 4, the proportion of the crystal grains in the nonmagnetic intermediate layer 3 having the grain size exceeding 8 nm is controlled from 40%, which is the data of Example 4 shown in FIG. 3, to 10%, which is the data of Example 5 shown in FIG. 5. As a result, a proportion of the crystal grains in the magnetic layer 4 having the grain size below 4 nm is reduced from 15% to 5%, and the deviation, which is the standard deviation divided by the mean grain size, is controlled to be 0.2. Through these effects, a remarkable reduction of noises and improvement of the SNR have been achieved. The magnetic layer 4 of Example 5 is laminated on the intermediate layer 3 having the standard deviation of the grain size of 1.4 nm. Thus, it has been demonstrated that the standard deviation of the grain sizes of the intermediate layer 3 may be 1.4 nm or smaller.

A crystal grain in the nonmagnetic intermediate layer 3 having the grain size of 8 nm or greater acts to separate the magnetic grain growing on the crystal grain, and hinders control of the grain size and the deviation of the crystal grains in the magnetic layer 4, and prevents control of the grain boundary segregation of the metal element in the magnetic layer 4. Accordingly, when the proportion of the crystal grains in the intermediate layer 3 having the grain size over 8 nm is decreased to within 10%, a proportion of the crystal grains in the magnetic layer 4 that have one to one correspondence to the crystal grain in the intermediate layer 3 increases, which is attributed to the above-mentioned reduction in noises and improvement in the SNR. Such crystal growth promotes the precise lattice matching to improve the lattice matching at the interface between the magnetic layer 4 and the intermediate layer 3, and also promotes the segregation structure by the aid of a columnar porous structure in the intermediate layer 3. Hence, excellent electromagnetic conversion characteristics can be achieved.

An magnetic recording medium, according to an aspect of the present invention, is provided with a nonmagnetic intermediate layer with hexagonal closed packed structure including Ru, Os, and/or Re between a magnetic layer 4 and an underlayer, wherein a degree of mismatching $\Delta=|d_1-d_2|/d_1$ is at most 10%, for instance in a range from 2.5% to 7.0%, where $d_1$ is a spacing of lattice planes of crystal grains in the magnetic layer 4 and $d_2$ is a spacing of lattice planes of crystal grains in the intermediate layer. According to an aspect of the present invention, the magnetic recording medium exhibiting reduced noises and excellent magnetic performance and electromagnetic conversion characteristics can be provided.

In addition, by controlling a distance between the crystal grains in the magnetic layer, an interaction between the magnetic crystal grains can be decreased. Because even in the case of minimized grain size in the magnetic layer, sufficiently high coercive force is held at room temperature, a stable high density recording can be accomplished with little effect of thermal disturbance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A magnetic recording medium, comprising:
   a substrate;
   a nonmagnetic underlayer;
   a nonmagnetic intermediate layer;
   a magnetic layer;
   a protective layer; and
   a lubricant film,
   wherein the magnetic layer has a granular structure comprising ferromagnetic crystal grains with a hexagonal closed packed structure and a nonmagnetic grain boundary region of an oxide intervening between the ferromagnetic crystal grains, the nonmagnetic underlayer has a body-centered cubic lattice structure, the nonmagnetic underlayer, the nonmagnetic intermediate layer, the magnetic layer, the protective layer, and the lubricant film are sequentially laminated on the substrate, the nonmagnetic intermediate layer is a nonmagnetic metal comprising Ru, Os, and/or Re, a degree of mismatching $\Delta=|d_1-d_2|/d_1$ is at most 10%, where $d_1$ is a spacing of lattice planes of crystal grains in the magnetic layer and $d_2$ is a spacing of lattice planes of crystal grains in the nonmagnetic intermediate layer, and a proportion of the crystal grains in the nonmagnetic intermediate layer with respect to a grain size of equal to or greater than 8 nm is at most 10% of the crystal grains in the nonmagnetic intermediate layer and a standard deviation of said grain size is at most 1.4 nm.

2. A magnetic recording medium, comprising:

a substrate;

a nonmagnetic underlayer;

a magnetic layer;

a protective layer;

a lubricant film, wherein the magnetic layer has a granular structure comprising ferromagnetic crystal grains with a hexagonal closed packed structure and a nonmagnetic grain boundary region of an oxide intervening between the ferromagnetic crystal grains, the underlayer has a body-centered cubic lattice structure, and the nonmagnetic underlayer, the magnetic layer, the protective layer, and the lubricant film are sequentially laminated on the substrate, a nonmagnetic intermediate layer with a hexagonal closed packed structure disposed between the magnetic layer and the underlayer, the nonmagnetic intermediate layer being a nonmagnetic metal comprising Ru, Os, and/or Re, a degree of mismatching $\Delta=|d_1-d_2|/d_1$ is at most 10%, where $d_1$ is a spacing of lattice planes of crystal grains in the magnetic layer and $d_2$ is a spacing of lattice planes of crystal grains in the nonmagnetic intermediate layer, and a proportion of the crystal grains in the nonmagnetic intermediate layer with respect to a grain size of equal to or greater than 8 nm is at most 10% of the crystal grains in the nonmagnetic intermediate layer and a standard deviation of said grain size is at most 1.4 nm.

3. The magnetic recording medium as recited in claim 2, wherein the substrate is not subjected to an intentional heating prior to depositing the layers.

4. The magnetic recording medium as recited in claim 2, wherein the substrate is a resin substrate.

5. The magnetic recording medium as recited in claim 2, wherein the substrate is not subjected to an intentional heating prior to depositing the layers.

6. The magnetic recording medium as recited in claim 2, wherein the substrate is a resin substrate.

7. The magnetic recording medium as recited in claim 2, wherein the degree of mismatching $\Delta$ is in a range from 2.5% to 7.0%.

8. The magnetic recording medium as recited in claim 1, wherein the ferromagnetic crystal grains comprise 12 at % to 20 at % of platinum.

9. The magnetic recording medium as recited in claim 1, wherein the substrate is not subjected to an intentional heating prior to depositing the layers.

10. The magnetic recording medium as recited in claim 9, wherein the substrate is a resin substrate.

11. The magnetic recording medium as recited in claim 1, wherein the substrate is a resin substrate.

12. A magnetic recording medium, comprising:

a substrate;

a nonmagnetic underlayer having a body-centered cubic lattice structure;

a nonmagnetic intermediate layer having a hexagonal closed packed structure;

a magnetic layer having a granular structure including ferromagnetic crystal grains with a hexagonal closed packed structure and a nonmagnetic grain boundary region of an oxide intervening between the ferromagnetic crystal grains;

a protective layer; and a lubricant film, wherein the nonmagnetic underlayer, the nonmagnetic intermediate layer, the magnetic layer, the protective layer, and the lubricant film are contiguous and respectively sequentially laminated on the substrate, the nonmagnetic intermediate layer is a nonmagnetic metal comprising Ru, Os, and/or Re, a degree of mismatching $\Delta=|d_1-d_2|/d_1$ is at most 10%, where $d_1$ is a spacing of lattice planes of crystal grains in the magnetic layer and $d_2$ is a spacing of lattice planes of crystal grains in the nonmagnetic intermediate layer, and a proportion of the crystal grains in the nonmagnetic intermediate layer with respect to a grain size of equal to or greater than 8 nm is at most 10% of the crystal grains in the nonmagnetic intermediate layer and a standard deviation of said grain size is at most 1.4 nm.

13. A magnetic recording medium, comprising:

a nonmagnetic underlayer having a body-centered cubic lattice structure;

a nonmagnetic intermediate layer; and a magnetic layer having a granular structure including ferromagnetic crystal grains with a hexagonal closed packed structure and a nonmagnetic grain boundary region of an oxide intervening between the ferromagnetic crystal grains, wherein the nonmagnetic layer underlayer, the nonmagnetic intermediate layer, and the magnetic layer are positioned sequentially, the nonmagnetic intermediate layer is a nonmagnetic metal comprising Ru, Os, and/or Re, wherein a degree of mismatching $\Delta=|d_1-d_2|/d_1$ is at most 10%, where $d_1$ is a spacing of lattice planes of crystal grains in the magnetic layer and $d_2$ is a spacing of lattice planes of crystal grains in the nonmagnetic intermediate layer, and a proportion of the crystal grains in the nonmagnetic intermediate layer with respect to a grain size of equal to or greater than 8 nm is at most 10% of the crystal grains in the nonmagnetic intermediate layer and a standard deviation of said grain size is at most 1.4 nm.

14. The magnetic recording medium as recited in claim 13, wherein the crystal grains in the magnetic layer grow epitaxially from the interface with the nonmagnetic intermediate layer.

* * * * *